United States Patent [19]

Hayashi et al.

[11] Patent Number: 4,826,702
[45] Date of Patent: May 2, 1989

[54] SEPARATE TYPE DRESSING

[75] Inventors: Masanori Hayashi, Fuchu; Sukefumi Ito, Tama, both of Japan

[73] Assignee: Q.P. Corporation, Japan

[21] Appl. No.: 231,611

[22] Filed: Aug. 10, 1988

Related U.S. Application Data

[63] Continuation of Ser. No. 875,284, Jun. 17, 1986, abandoned.

[51] Int. Cl.$^4$ .......................... A23L 1/24; A23D 5/00
[52] U.S. Cl. ................................... 426/589; 426/613; 426/608; 260/420
[58] Field of Search ............... 426/488, 601, 602, 589, 426/613; 260/420

[56] References Cited

U.S. PATENT DOCUMENTS

| 1,625,641 | 4/1927 | Douglas et al. | 426/602 |
| 2,114,490 | 4/1934 | Harris | 426/602 |
| 2,407,616 | 9/1946 | Phelps | 426/488 |

FOREIGN PATENT DOCUMENTS

| 1172655 | 8/1984 | Canada | 426/488 |
| 59-60882 | 3/1984 | Japan . | |
| 0207560 | 10/1985 | Japan | 426/602 |
| 0805986 | 2/1981 | U.S.S.R. | 426/602 |

*Primary Examiner*—Jeanette Hunter
*Attorney, Agent, or Firm*—Jordan B. Bierman

[57] ABSTRACT

A separate type dressing consisting of an oil phase and an aqueous phase separately contained, in which the oil phase consists of oils and fats containing a purified fish oil which is substantially free of fish smell components and precursors thereof, and the aqueous phase consists of vinegar containing one or more additives selected from the group including citrus flavor, soy sauce and miso.

14 Claims, No Drawings

SEPARATE TYPE DRESSING

This application is a continuation of application Ser. No. 875,284, filed June 17, 1986.

BACKGROUND OF THE INVENTION

This invention relates to a separate type dressing having as components an oil phase and an aqueous phase which are separately contained.

Dressings used as a condiment for salad and cooking generally include an emulsion type dressing and a separate type dressing.

The emulsion type dressing is based on oil phase materials and aqueous phase materials, added with a small quantity of spices, condiments and other additives and emulsified. The separate type dressing consists of an oil phase and an aqueous phase which are kept separate, and stirred and mixed immediately prior to use.

Either in the emulsion type or separate type dressing, the oil phase materials have been based on purified vegetable salad oils made of oils extracted from soybean, rapeseed and cottonseed oil. But purified fish oils which are purified by the same method as for the vegetable salad oils have not been used for the purpose. This is because conventional purified fish oils contain precursors of fish smell components such as low molecular amines and ketones which are odorless immediately after preparation but change to fish smell components with passage of time and emit an offensive odor. However, purified fish oil contains a large quantity of highly unsaturated fatty acids such as oleic acid and eicosapentaenic acid, and very useful in view of nutriment. It also has an effect of maintaining the cholesterol content in blood within an adequate range, thereby effectively suppressing occurrence of thrombosis. Therefore, if the problem of bad smell is solved, the purified fish oil can be used for the manufacture of dressing, materializing the above advantages.

SUMMARY OF THE INVENTION

It is a primary object of the present invention to provide a separate type dressing that does not emit an offensive odor based on purified fish oil which is substantially free of fish smell components and precursors thereof.

In accordance with the present invention which attains the above object, there is provided a separate type dressing comprising an oil phase and an aqueous phase which are separately contained, in which the oil phase consists of oils and fats containing a purified fish oil which is substantially free of fish smell components and precursors thereof, and the aqueous phase consists of vinegar containing one or more additives selected from the group including citrus flavor, soy sauce and miso.

DETAILED DESCRIPTION OF THE INVENTION

The oil phase contains a purified fish oil which is substantially free of fish smell components and precursors thereof.

Purified fish oil used for the dressing according to the present invention must be substantially free of fish smell components and precursors thereof. There is provided an approximate evaluation criterion for determining whether a purified fish oil satisfies the above condition. Purified fish oil immediately after production is added with an antioxidant such as tocopherol and kept in a container such as a can, closed air tight, at normal temperature for 10 days or more. After keeping, if the fish oil emits substantially no fish smell, it can be used as a material for the dressing according to the present invention.

Purified fish oil that satisfies the above condition cannot be obtained by treating crude fish oil by a conventional purification method such as deoxidation, decolorization, deodorization or winterization. An example of a method for obtaining purified fish oil that can be used as a material for the dressing according to the present invention will be described below.

5 parts by weight of a polyhydric alcohol such as glycerine and 5 parts by weight of a monoglyceride such as monooleyl glyceride are added to 100 parts by weight of crude fish oil, and the mixture is heated at 50 degrees C with stirring to obtain a transparent oil mixture.

The oil mixture is deodorized continuously by a vacuum falling-film deodorizer heated with a heating medium having an evaporation area of $2m^2$, at a feed temperature of 70 to 80 degrees C and a falling-film temperature of 130 to 150 degrees C, under a reduced pressure of 50 to $30 \times 10^{-3}$ Torr, and at a feed rate of 210 $kg/hr/m^2$ to obtain a deodorized oil.

The deodorized oil is then distilled continuously by a high-vacuum falling-film still heated by a heating medium having an evaporation area of $2 m^2$, at a feed temperature of 150 to 170 degrees C and a falling-film temperature of 220 to 230 degrees C, under a reduced pressure of 7 to $10 \times 10^{-3}$ Torr, at a feed rate of 110 $kg/hr/m^2$, for the first distillation to obtain a first residual oil. The first residual oil is distilled continuously by a heated centrifugal molecular still having an evaporation area of $1 m^2$, at a feed temperature of 170 to 180 degrees C, under a reduced pressure of 3 to $5 \times 10^{-3}$ Torr, and at a feed rate of 50 $kg/hr/m^2$, for the second distillation to obtain a second residual oil. The second residual oil is then distilled continuously by a centrifugal molecular still heated with a heating medium having an evaporation area of $1 m^2$, at a feed temperature of 200 to 210 degrees C and a film temperature of 280 to 290 degrees C, under a reduced pressure of 3 to $5 \times 10^{-3}$ Torr, and at a feed rate of 30 $kg/hr/m^2$, for the third distillation to obtain a distillate as a purified fish oil. The resulting purified fish oil is added with an antioxidant, contained in a closed container, and used as a material for the dressing according to the present invention.

The above described procedure provides a purified fish oil which is substantially free of fish smell components and precursors thereof. The purified fish oil smells substantially no fish-like odor and can be used as a material for the oil phase of the dressing according to the present invention. The content of the purified fish oil is preferably 30 to 60 weight % of the entire quantity of oils and fats used in the dressing according to the present invention.

The other oil and fat materials than the purified fish oil can be either vegetable or animal oils and fats, however, use of vegetable oils in amount of 20 to 30 weight % of the total oils is preferable in view of taste and balance in nutriment of the resuting dressing. The oil mixture thus obtained is normally used in amount of 15 to 70 weight % of the dressing, but the amount of addition is not limited to the above range.

The aqueous phase is based on vinegar, with one or more additives selected from the group including citrus flavor, soy sauce and miso added.

The purified fish oil used in the oil phase contains a high concentration of highly unsaturated fatty acids which are liable to become rancid with passage of time and to emit an offensive odor similar to fish smell. The above vinegar and the additives in the aqueous phase are used to mask such an eventual change in odor.

The citrus flavor can be lemon essence or lemon juice, used in amount of 0.01 to 0.1 weight % of the aqueous phase. Soy sauce is preferably used in amount of 30 to 60 weight % of the aqueous phase, and miso is preferably used in amount of 10 to 20 weight % of the aqueous phase. One or more of the above additives can be used in the aqueous phase. If the content of the additives is less than the above range, masking effect for the dressing is insufficient. If more than the above range, taste of the additives is excessive.

The oil phase and the aqueous phase are contained in a specified container to obtain a complete product of the dressing according to the present invention.

If an emulsion type dressing is prepared based on the purified fish oil, vinegar, citrus flavor and other additives, the resulting dressing has a considerable rancidity similar to fish smell and is not suitable to taste, according to a test performed by the inventor of the present invention. This would be due to a fact that a large volume of air is occluded in the dressing during the emulsification process and the highly unsaturated fatty acids contained in the purified fish oil rapidly become rancid.

DESCRIPTION OF THE PREFERRED EMBODIMENTS

Four samples of the separate type dressing according to the present invention and six comparison samples of separate type dressing are prepared according to the formulations listed in Table 1, and each sample is contained in a closed glass bottle.

Referring to Table 1, purified fish oil (1) is a purified fish oil which is substantially free of fish smell components and precursors thereof, prepared by adding glycerine and a monoglyceride to crude sardine oil, followed by deodorization and molecular distillation.

Purified fish oil (2) is a commercial fish oil prepared by purifying crude sardine oil by the same method as for the preparation of vegetable salad oils.

The above samples of separate type dressing are kept at a normal temperature of 20 degrees C for 10 days or 30 days after the preparation. After keeping under the specified conditions, each sample is provisionally emulsified and tasted. The test results are shown in Table 2.

TABLE 1

| Material | Oil Phase | | | Aqueous phase | | | | | | |
|---|---|---|---|---|---|---|---|---|---|---|
| | Purified fish oil (1) | Purified fish oil (2) | Soybean salad oil | Vinegar | Water | Lemon juice | Soy sauce | Miso | White pepper powder | Paprica |
| Samples according to present invention | | | | | | | | | | |
| No. 1 | 40 | — | 20 | 30 | 9.5 | 0.5 | — | — | — | — |
| 2 | 40 | — | 20 | 20 | 5 | — | 15 | — | — | — |
| 3 | 40 | — | 20 | 25 | 10 | — | — | 5 | — | — |
| 4 | 60 | — | — | 30 | 9.8 | 0.2 | — | — | — | — |
| Comparison samples | | | | | | | | | | |
| 1 | 40 | — | 20 | 30 | 10 | — | — | — | — | — |
| 2 | 60 | — | — | 30 | 10 | — | — | — | — | — |
| 3 | — | 40 | 20 | 20 | 5 | — | 15 | — | — | — |
| 4 | — | 40 | 20 | 30 | 10 | — | — | — | — | — |
| 5 | — | 60 | — | 25 | 10 | — | — | 5 | — | — |
| 6 | — | 60 | — | 30 | 10 | — | — | — | — | — |
| Reference samples | | | | | | | | | | |
| 7 | 40 | — | 20 | 30 | 9 | — | — | — | 0.5 | 0.5 |
| 8 | — | 40 | 20 | 30 | 9 | — | — | — | 0.5 | 0.5 |

TABLE 2

| | Immediately after preparation | After 10 days | After 30 days |
|---|---|---|---|
| Samples according to present invention | | | |
| No. 1 | No fish smell, good taste | No fish smell, good taste | No fish smell, good taste |
| 2 | No fish smell, good taste | No fish smell, good taste | No fish smell, good taste |
| 3 | No fish smell, good taste | No fish smell, good taste | No fish smell, good taste |
| 4 | No fish smell | No fish smell | No fish smell |
| Comparison samples | | | |
| 1 | No fish smell | Slightly rancid | Rancid |
| 2 | No fish smell | Slightly rancid | Rancid |
| 3 | Slightly fish smelling | Fish smelling | Fish smelling, untastable |
| 4 | Slightly fish smelling | Fish smelling | Fish smelling, untastable |
| 5 | Slightly fish smelling | Fish smelling | Fish smelling, untastable |
| 6 | Slightly fish smelling | Fish smelling | Fish smelling, untastable |
| Reference samples | | | |
| 7 | No fish smell | Slightly rancid | Rancid |
| 8 | Slightly fish smelling | Fish smelling | Fish smelling, untastable |

Note:
The evaluation test was carried out by a panel of 10 skilled persons, and the evaluation results for each sample are averaged.

First embodiment 100 parts by weight of fresh water, 60 parts by weight of vinegar, 30 parts by weight of sugar and 10 parts by weight of soy sauce are homogeneously mixed to obtain an aqueous phase. 60 parts by weight of the aqueous phase is placed in a vessel, and 40 parts by weight of a purified fish oil which is the same as the purified fish oil (1) used in the test described above, free of detectable ketones and amines, having an acid value of 0.1, is added to the aqueous phase to obtain a separate type dressing which is quite free of fish smell.

Note: Hereinafter part(s) indicates part(s) by weight unless otherwise noted.

Second embodiment 60 parts of the aqueous phase obtained in the first embodiment and 40 parts of an oil phase consisting of 20 parts of the purified fish oil which is the same as that used in the first embodiment and 20 parts of soybean salad oil are placed in a vessel to obtain a separate type dressing which is quite free of fish smell.

Third embodiment 100 parts of fresh water, 60 parts of vinegar, 10 parts of sugar and 20 parts of miso are homogeneously mixed to obtain an aqueous phase. 50 parts of soybean salad oil and 50 parts of the purified fish oil which is the same as that used in the first embodiment are mixed to obtain an oil phase. 90 millilitres of the aqueous phase is placed in a 200-millilitre glass vessel, and then 90 millilitres of the oil phase is added into the vessel to obtain a miso-tasted separate type dressing.

Since the purified fish oil used for the oil phase of the separate type dressing according to the present invention is substantially free of fish smell components and precursors thereof, the resulting separate type dressing does not emit any unusual odor even after storage for an extended period of time. As compared with an emulsion type dressing, the separate type dressing according to the present invention is less liable to become rancid during storage for an extended time because of reduced frequency and time of contact of the purified fish oil with air. Further, the aqueous phase containing citrus flavor, soy sauce and/or miso will mask slight rancidity of the purified fish oil, thereby providing a dressing of good taste.

We claim:

1. A method of producing purified fish oil comprising the addition of polyhydric alcohol and monoglyceride to raw fish oil deodorizing said mixture by removal of volatile matter
subjecting said deodorized mixture to molecular distillation
the resulting purified fish oil being substantially free of fish smell components and precursors thereof.

2. The purified fish oil produced by the method of claim 1.

3. Components for salad dressing comprising an oil phase and an aqueous phase separately contained, said oil phase consisting of oils and fats containing a purified fish oil as claimed in claim 2 and said aqueous phase consisting of vinegar and one or more additive.

4. Components as claimed in claim 3 wherein said additive is citrus flavor.

5. Components as claimed in claim 3 wherein said additive is soy sauce.

6. Components as claimed in claim 3 wherein said additive is miso.

7. Components as claimed in claim 3 wherein said aqueous phase and said oil phase are kept separate until use.

8. Components as claimed in claim 2, wherein said purified fish oil is contained in amount of 30 to 60 percent by weight of said entire oils and fats.

9. Components as claimed in claim 1, wherein said purified fish oil does not contain low molecular weight amines and ketones as precursors of said fish smell components.

10. Components as claimed in claim 3, wherein said citrus flavor is lemon essence or lemon juice.

11. Components as claimed in claim 3, wherein said citrus flavor is contained in amount of 0.01 to 0.1 percent by weight in said aqueous phase.

12. Components as claimed in claim 4, wherein said soy sauce is contained in amount of 30 to 60 percent by weight in said aqueous phase.

13. Components as claimed in claim 4, wherein said miso is contained in amount of 10 to 20 percent by weight in said aqueous phase.

14. A separate type dressing of claim 8 wherein said purified fish oil does not contain low molecular weight amines and ketones as precursors of said fish smell components.

* * * * *